STATISTICAL DELTA MODULATION SYSTEM

Filed Oct. 23, 1965 6 Sheets-Sheet 1

INVENTOR.
TERRENCE L. FINE
BY Weingarten, Orenbruch & Lahive
ATTORNEYS

INVENTOR.
TERRENCE L. FINE
BY Weingarten, Orenbuch & Lahive
ATTORNEYS

July 16, 1968 T. L. FINE 3,393,364

STATISTICAL DELTA MODULATION SYSTEM

Filed Oct. 23, 1965 6 Sheets-Sheet 3

INVENTOR.
TERRENCE L. FINE
BY Weingarten, Oreenbach & Lahive
ATTORNEYS

INVENTOR.
TERRENCE L. FINE
BY Weingarten, Orenbuch & Lahive
ATTORNEYS

INVENTOR.
TERRENCE L. FINE
BY Weingarten, Orenbuch & Lahive
ATTORNEYS

INVENTOR.
TERRENCE L. FINE
BY Weingarten, Orenbuch & Lahive
ATTORNEYS 3,393,364
Patented July 16, 1968

3,393,364

STATISTICAL DELTA MODULATION SYSTEM

Terrence L. Fine, Berkeley, Calif., assignor to Signatron, Inc., Lexington, Mass., a corporation of Massachusetts Filed Oct. 23, 1965, Ser. No. 502,911
14 Claims. (Cl. 325—38)

This invention relates in general to the transmission of analog data by digital signals. More particularly, the invention concerns an improved delta modulation system which minimizes the error between the actual value of the analog signal at the transmitter and the value that is decoded at the receiver.

A delta modulation system is a type of pulse communication system in which an analog signal is intermittently sampled and, instead of the absolute signal amplitude being transmitted at each sampling, only the change occurring in the analog signal from one sample to the next is conveyed by the transmitted pulses. In the conventional delta modulation system, the direction of change is indicated at each sampling and not the magnitude of the change. Because the conventional delta modulation system is limited to a unit amplitude level change per pulse, the conventional system is seriously deficient in its ability to follow a signal whose change in amplitude from one sampling instant to the next exceeds the unit level of the system. That is, the conventional delta modulation system has a maximum rate of change of amplitude which the input signal ought not to exceed. Where the input signal does exceed that maximum rate of amplitude change, the conventional system introduces a large error so that the signal reconstructed at the decoder of the system is not a faithful replica of the input signal.

The present invention substantially reduces the deficiencies of the conventional delta modulation system.

The invention resides in a statistical delta modulation system utilizing, in its encoder, a comparator which intermittently compares the input analog signal with a level setting supplied from a store of $2^m$ level values. The level setting used in the comparator is determined by the sequence of delta modulated pulses resulting from a number of the immediately preceding comparisons, where that number is represented by the memory length $m$. The $2^m$ level values are, where feasible, determined analytically from the statistical properties of the input analog signal. In effect, the statistical delta modulation system employs the most recent segment of the past history of comparisons with the input analog signal to determine, on a statistical basis, the level setting that will most closely approximate the actual level of the analog signal at the next comparison. That is, the sequence of delta modulated pulses produced during an immediately preceding interval $m$, is employed to select the level setting to be used in the next comparison. The decoder employed in the statistical delta modulation system utilizes a set of $2^k$ reconstruction level values to regenerate the input signal waveform. The sequence of the last $k$ received signals is utilized to select the reconstruction level value used in the regeneration. The $2^k$ reconstruction level values are, preferably, determined analytically from the statistical properties of the input analog signal.

The invention, both as to its arrangement and its manner of operation, can be more readily apprehended from the exposition which follows when considered in conjunction with the accompanying drawings in which.

Figure 4:
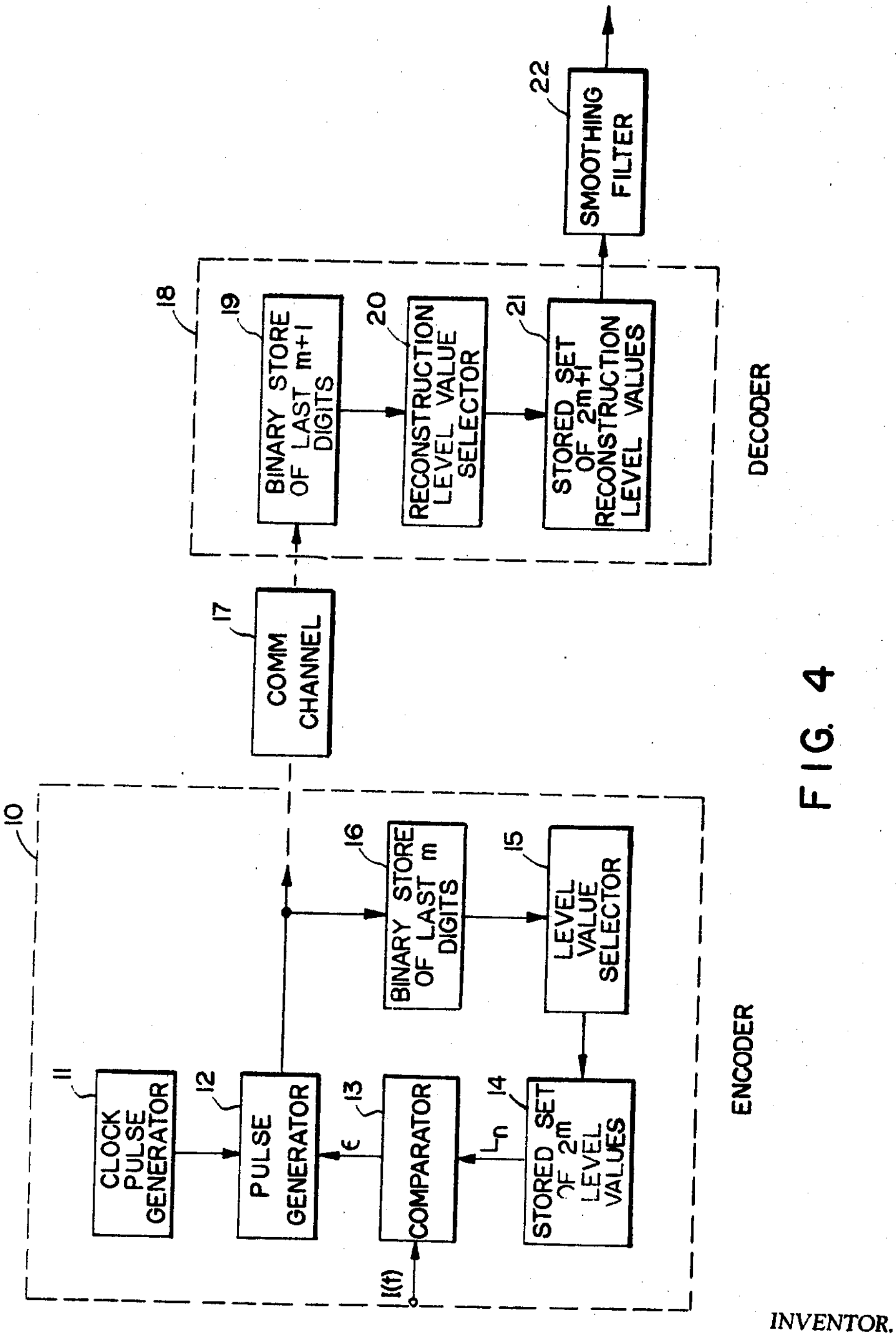
FIG. 4 depicts the scheme of a system embodying the invention.
Figure 6:
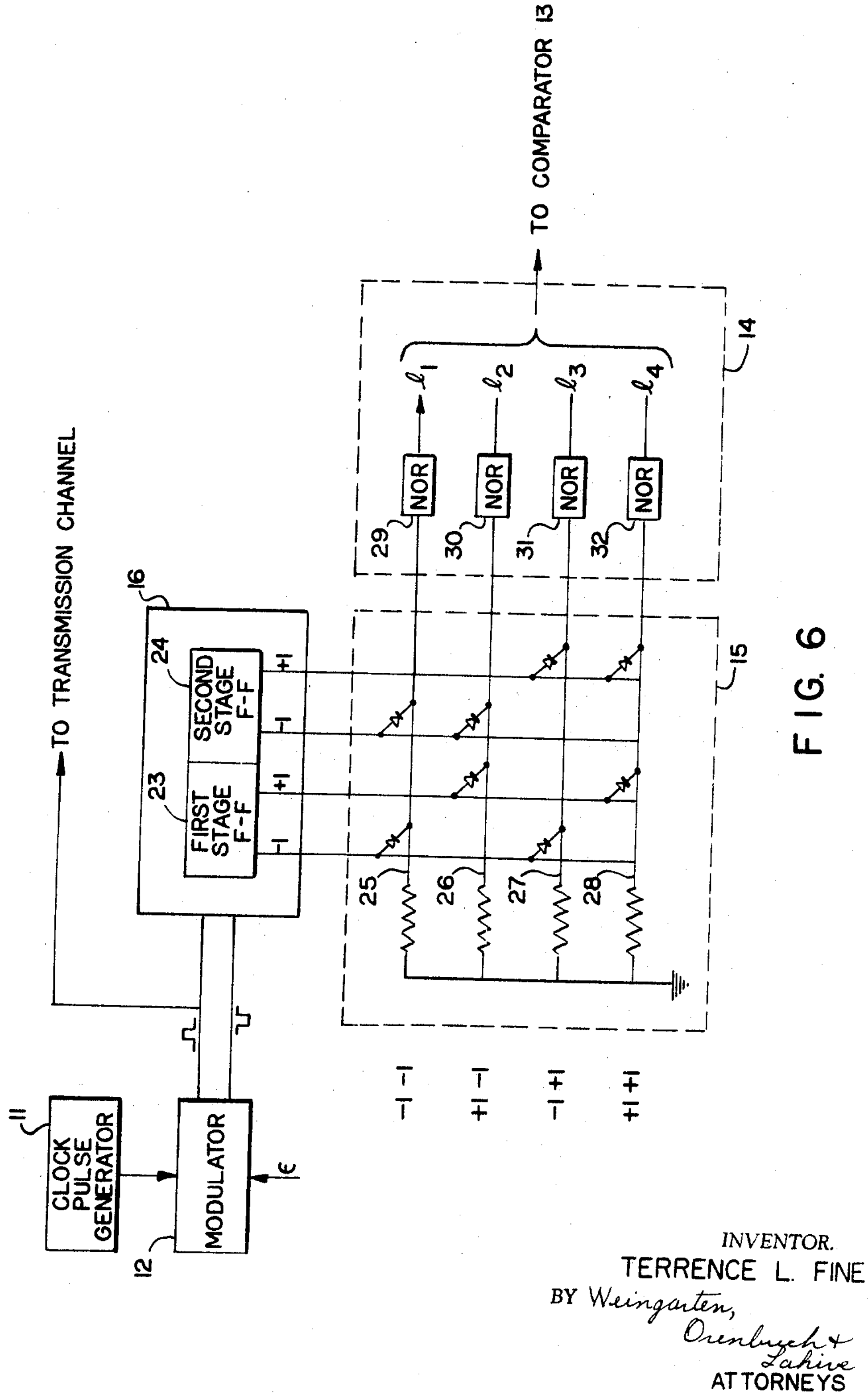
Figure 7:
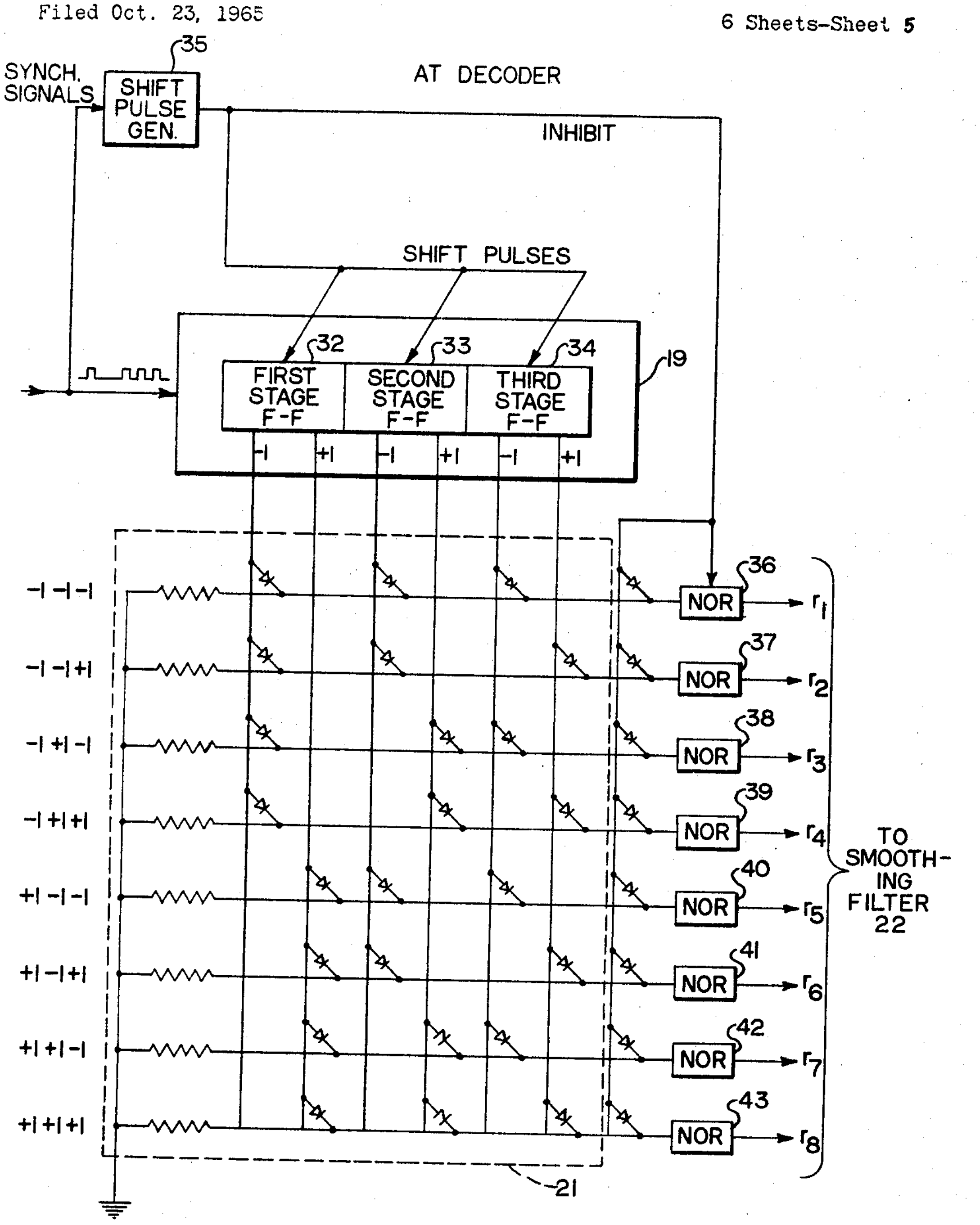
Figure 8:
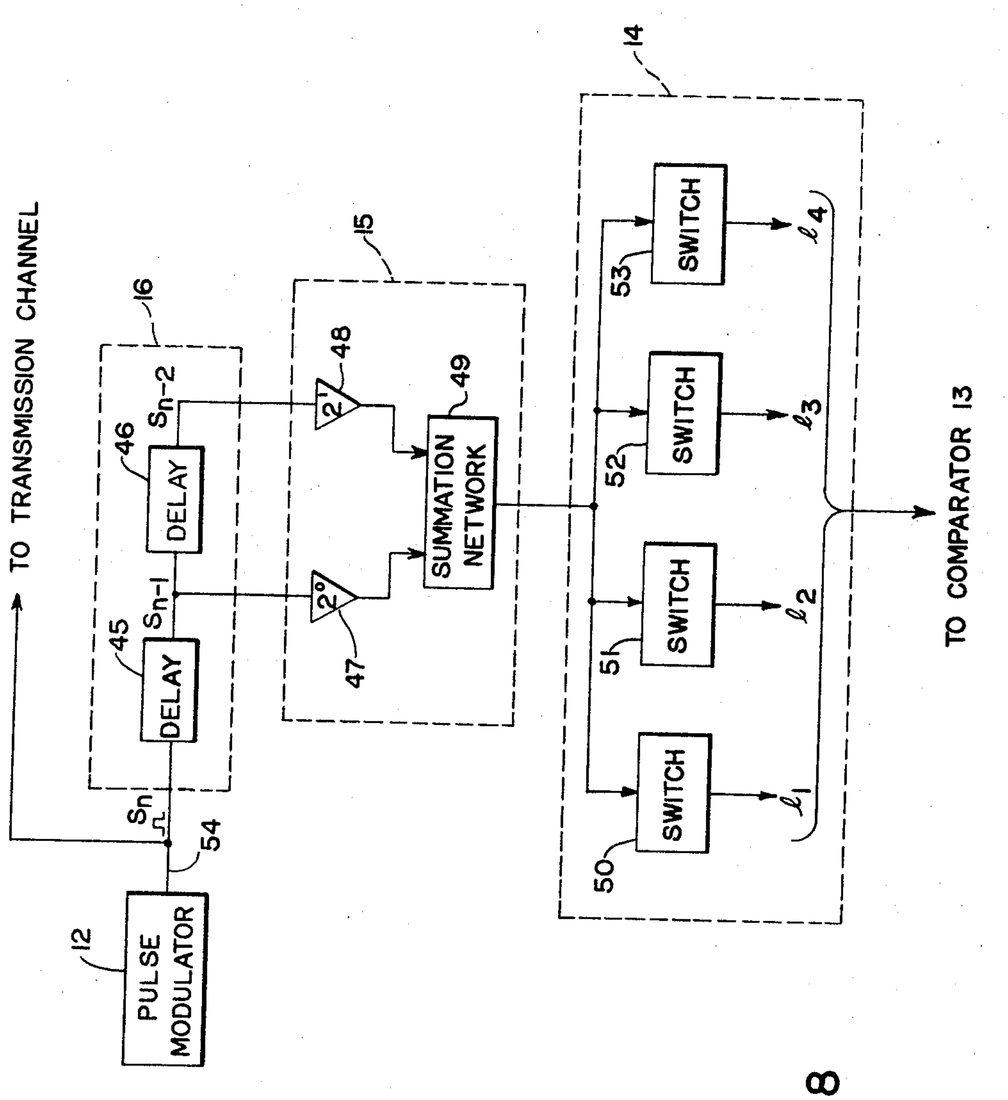

FIGS. 5A, 5B, 5C, and 5D are diagrams pertaining to the operation of the statistical delta modulation system depicted in FIG. 4;

FIG. 6 shows details of the apparatus employed in the encoder of the invention;

FIG. 7 shows details of the apparatus employed in the decoder of the invention; and FIG. 8 depicts apparatus that may be employed in the encoder of the invention in lieu of the structural arrangement illustrated in FIG. 6.

Figure 1:
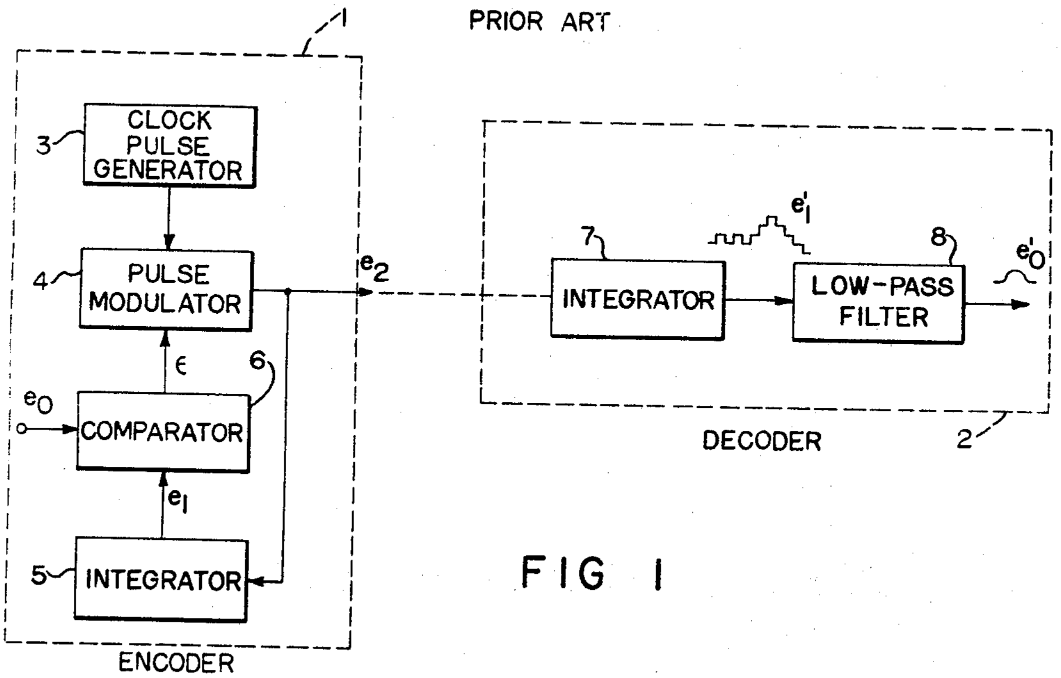
FIG. 1 illustrates the scheme of a conventional delta modulation system.

FIG. 1 depicts the scheme of a conventional delta modulation system having an encoder 1 at the transmitter and a decoder 2 at the receiver. For expository purposes, it is assumed that the intelligence or message to be transmitted is the waveform $e_0$ of FIG. 2A. At the transmitter, the waveform $e_0$ is encoded as a train of pulses and at the received the pulses are utilized to reconstruct the original waveform.

The encoder portion of the conventional delta modulation system employs a clock pulse generator 3 which periodically emits a pulse to modulator 4. The modulator emits a positive or negative pulse for each clock pulse from generator 3. The output of the modulator is impressed upon an integrating network 5 which has its output coupled to an input of comparator 6. The comparator is a device which compares the amplitude of the integrated signal $e_1$ with the signal $e_0$ which is applied to the other input of the comparator and provides an output signal $\epsilon$ whose polarity is determined by the sense of the difference. That is, where the amplitude of the integrated signal $e_1$ is larger than the amplitude of signal $e_0$ at time $t_1$, the output signal $\epsilon(t_1)$ from the comparator is, for example, a positive signal, whereas if the integrated signal $e_1$ is smaller than the amplitude of signal $e_0$ at time $t_1$, the output signal $\epsilon(t_1)$ is a negative signal. The output $\epsilon$ of the comparator governs pulse modulator 4 and causes the modulator to emit a positive pulse where the difference signal $\epsilon(t)$ is of one electrical polarity or emit a negative pulse where the difference signal $\epsilon(t)$ is of the other electrical polarity. The comparator, therefore, determines at each sampling instant $t$ whether the pulse emitted by the modulator is a positive pulse or a negative pulse and the decision depends upon the amplitude of the feedback signal $e_1$ obtained from the integrator at time $t$. Sampling of the input signal is done at periodic intervals $t_1, t_2, t_3 \ldots t_n$ which are determined by the clock pulses from pulse generator 3.

Figure 2:
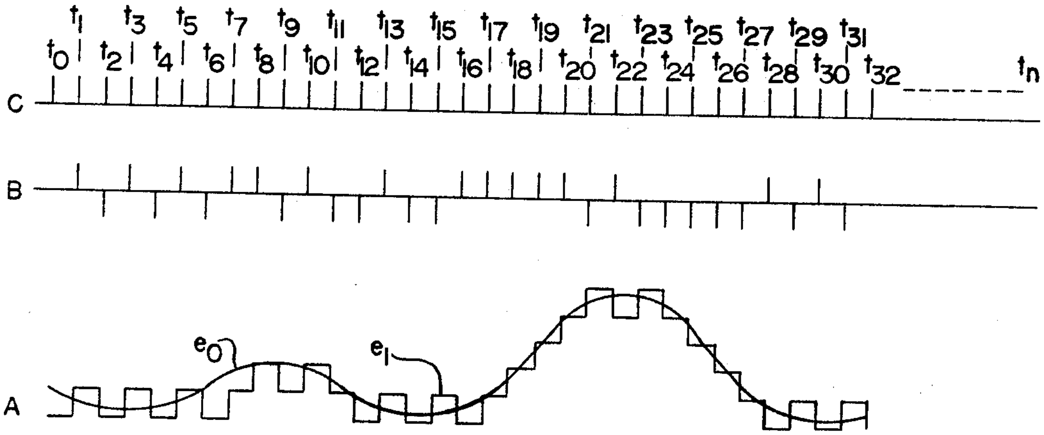
FIG. 2A shows waveforms employed in the discussion of the conventional delta modulation system.
FIG. 2B depicts the delta modulated pulse signals associated with FIG. 2A.
FIG. 2C is a timing diagram used in connection with FIGS. 2A and 2B.

The train of clock pulses supplied by pulse generator 3 is shown in FIG. 2C, the train of positive and negative pulses emitted by modulator 4 is depicted in FIG. 2B, and the integrated signal $e_1$ supplied to comparator 6 is shown in FIG. 2A. The delta modulated pulse output of modulator 4 is applied to integrator 5 and results in the waveform $e_1$. For each positive pulse in the delta modulated train $e_2$, waveform $e_1$ rises by one unit step and for each negative pulse in the delta modulated train $e_2$, the waveform $e_1$ falls by one unit step. Signal $e_1$, therefore, is a stepped waveform which can change only by one unit step from one sampling interval to the next. In comparator 6, waveform $e_1$ is compared with input signal $e_0$. The output of the comparator at sampling time $t$ determines what the polarity of the output pulse from modulator 4 should be to correct for the difference between the amplitudes of the compared signals. The feedback system in the encoder acts to reduce the difference by causing the synthesized signal $e_1$ to step up or down to follow the message signal $e_0$. In effect, the change in signal amplitude from one sampling instant to the next is transmitted in a delta modulation system rather than the absolute signal amplitude at each sampling instant.

In practice, the negative pulses in the delta modulated train $e_2$ may be omitted in the transmission of the coded signals without affecting the logical design of the receiver.

At the receiver, the delta modulated pulse train $e_2$ is impressed upon the decoder portion of the system. The decoder utilizes an integrating network 7 whose output is coupled to a low pass filter 8. In the decoder, the delta modulated pulse train $e_2$ is again integrated to result in the stepped voltage waveform $e_1'$ which consists of the original message waveform $e_0$ plus noise components due to quantization and sampling. By passing the $e_1'$ signal through low pass filter 8, the quantization and sampling noise components are substantially removed so that the reconstructed signal $e_0'$ at the filter's output is a close replica of message signal $e_0$.

Figure 3:
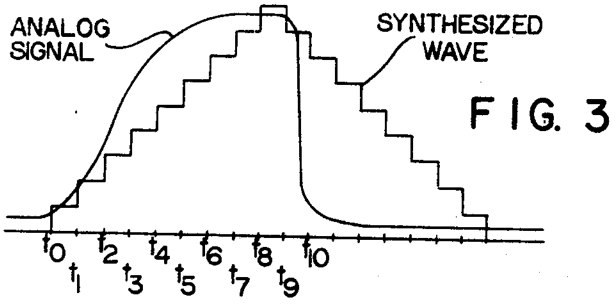
FIG. 3 illustrates the slope limited action of the conventional delta modulation system.

In the conventional delta modulation system, the information contained in the transmitted pulses is correlated to changes of the input signal and not to the absolute amplitude of the signal. That is, the transmitted pulses indicate the direction of change in the input signal at each sampling but do not indicate the magnitude of the change. Because the synthesized wave can change only one level per clock pulse, the synthesized wave cannot closely follow the analog waveform where the analog signal has a large and abrupt change in amplitude. The largest slope the conventional system can reproduce is one changing by one level or step every pulse interval. For example, in FIG. 3, the synthesized wave is shown increasing by one level from $t_0$ to $t_{10}$. That is, the synthesized wave required ten pulse intervals to achieve its peak to peak amplitude. If the analog signal rises from peak to peak in five pulse intervals, the synthesized wave cannot closely follow that rise. Thus the slope of the synthesized wave in the conventional delta modulation system is limited to one step for every pulse interval.

The invention resides in the improved delta modulation system schematically depicted in FIG. 4. That system is intended to be "tailored" to the statistical properties of the input analog data which is to be transmitted. If the statistical properties of the input analog data are known, the optimum design of the system can be determined analytically. Where the statistical properties of the input data are not known, but a sample of the input data is available, the optimum design may be estimated.

The design of the encoder in the statistical delta modulation system depends on the number of past samples which are taken of the analog input signal and employed in the generation of each output from the pulse modulator. The number of samples employed in the generation of each output from the modulator is denoted by *m,* which is called the *memory length.* In the system of FIG. 4, the encoder 10 employs a pulse generator 11 to intermittently supply a pulse to pulse modulator 12. For the purpose of this discussion, it is assumed that the pulses from generator 11 are emitted periodically, although in the general case the pulses need only be emitted intermittently. The pulse modulator emits a positive or negative pulse for each clock pulse from generator 11. For purposes of this exposition, a positive pulse has a binary value of +1 and a negative pulse has a binary value of −1. The determination of whether pulse modulator 12 emits a +1 digit signal or a −1 digit signal is controlled by a signal $\epsilon$ coupled to the modulator from a comparator 13. The analog signal $I(t)$ is applied as one input to comparator 13 and the other input $L_n$ is a level setting voltage supplied from a set of voltage level values available from store 14. In the comparator the input analog signal $I(t)$ is compared with the level setting $L_n$ and the comparator emits a signal $\epsilon$ indicating the sense of the difference between the compared signals. That is where the level setting $L_n$ is larger than the amplitude of $I(t)$ at time $t_1$, the output signal $\epsilon(t_1)$ from the comparator is, for example, a positive signal, whereas if the level setting $L_n$ is smaller than the amplitude of $I(t)$ at time $t_1$, the output signal $\epsilon(t_1)$ is a negative signal. In effect, the input analog signal $I(t)$ is sampled once for each clock pulse emitted by clock pulse generator 11 and the sample is compared against the level setting $L_n$. The sampled value of $I(t)$ at time $t_n$ is here denoted by $I_n$ $$\therefore I_n = I(t_n)$$

The sampled values $I_1, I_2 \ldots$ occurring respectively at times $t_1, t_2 \ldots$ result in the emission of signals $\epsilon(t_1)$, $\epsilon(t_2) \ldots$ from comparator 13 which cause pulse modulator to emit binary digital signals $S_1, S_2 \ldots$, each signal having a binary value that is either −1 or +1. The *n*th binary digital signal emitted by the pulse modulator is denoted $S_n$ where $S_n$ is either −1 or +1.

In the encoder portion of the statistical delta modulation system, the essence of the invention resides in the selection of the level setting $L_n$. In the conventional delta modulation system depicted in FIG. 1, the level setting signal is the $e_1$ signal obtained from the integrator 5 which integrates the positive pulses (+1's) and the negative pulses (−1's) emitted by modulator 4. In the encoder 10 of the statistical delta modulation system, the level setting signal $L_n$ is one of $2^m$ level values selected from the set of level values held in store 14. The $2^m$ stored level values, $l_1, l_2 \ldots l_{2m}$ are determined analytically if the statistical properties of the input analog signal are known. Otherwise, the level values can be estimated from available data. The level setting $L_n$, chosen from the stored set, is determined by a level value selector 15 to be the best choice for the particular sequence of previously generated *m* binary digits held in a binary signal storage device 16.

Assuming, for example, that the statistical delta modulation system of FIG. 4 has a memory length $m=2$ and that two digital signals $S_1$ and $S_2$ previously emitted by modulator 12 are entered in binary store 16, then upon the occurrence of the next clock pulse at time $t_3$, the analog sample $I_3$ is to be compared to a level setting $L_3$. Because each of the two previously generated binary digital signals $S_1$ and $S_2$ may have a digital value of +1 or −1, there are $2^m=4$ possible sequences of those binary digits, thus

| $S_1$ | $S_2$ |
|---|---|
| −1 | −1 |
| +1 | −1 |
| −1 | +1 |
| +1 | +1 |

For each sequence, there corresponds a pre-computed level value $l_1$, $l_2$, $l_3$, or $l_4$. Therefore, four (i.e. $2^m$) level values have been pre-computed and are available from store 14. The particular sequence $S_1$, $S_2$, entered in binary store 16 causes level value selector 15 to choose the proper level value from the set in store 14 and that chosen level value becomes level setting $L_3$ with which $I_3$ is compared in comparator 13. Where the voltage amplitude, of $I_3$ exceeds level setting $L_3$, the $\epsilon(t_3)$ signal from the comparator causes pulse modulator 12 to emit a positive pulse, denoting that $S_3=+1$; where the amplitude of $I_3$ is less than level setting $L_3$, the $\epsilon(t_3)$ signal from the comparator causes the pulse modulator to emit a negative pulse, denoting that $S_3=-1$.

At the start of the transmission, binary store 16 may initially be filled with arbitrarily chosen digits. The improper transient which results from having initially inserted arbitrarily chosen digits in binary store 16 gradually dies out as the transmission progresses, with the result that the system "pulls in" to proper operation. The "pull in" time can be shortened by using $2^m-1$ additional level values $l_{01}, l_{02} \ldots l_0\ (2^m-1)$. Level value $l_{01}$, in store 14, is used to generate $S_1$ after the first analog voltage sample $I_1$ is taken in comparator 13. At the time that level value $l_{01}$ is used there are as yet no signals in store 16. After $S_1$ enters store 16, one of two additional level values $l_{02}$ and $l_{03}$, in store 14, can be chosen by selector 15 to be applied to comparator 13 for comparison with analog sample $I_2$. Level value $l_{02}$ is selected where the binary value of $S_1$ is −1, whereas level value $l_{03}$ is chosen where the binary value of $S_1$ is +1. The comparison of $I_2$ with either level setting $l_{02}$ or level setting $l_{03}$ results in the generation of $S_2$ by modulator 12. After $S_1$ and $S_2$ are entered in binary store 16, selector 15 chooses one of the four level values $l_1$, $l_2$, $l_3$, or $l_4$ and the operation is as described previously. After the generation of $S_1$ and $S_2$, the start-up level values $l_{01}$, $l_{02}$, and $l_{03}$ are not needed unless transmission is interrupted and must be commenced again.

Where the encoder is intended to have rapid "pull in," there are in this example a total of seven level values constituting the set in store 14, three of the levels being used in the start-up phase of the transmission and the other four levels being used after the start-up phase. In a typical statistical delta modulation system we may, by way of example, adopt the following rules for choosing the level setting $L_n$;

$$L_1 = l_{01}$$
$$L_2 = (l_{03} \text{ if } S_1 = +1)$$
$$(l_{02} \text{ if } S_1 = -1)$$

and thereafter the level setting $L_n$ is chosen as follows:

| if $S_{n-2}$ | and $S_{n-1}$ | then $L_n$ |
|---|---|---|
| −1 | −1 | $l_1$ |
| +1 | −1 | $l_2$ |
| −1 | +1 | $l_3$ |
| +1 | +1 | $l_4$ |

The decoder 18 of the statistical delta modulation system of FIG. 4 employs a binary storage device 19 in which are stored the last $m+1$ digits corresponding to the transmitted binary signals $S_1$, $S_2$ . . . . The signals $S_1'$, $S_2'$ . . . , received at the decoder may differ, in a practical situation, from the transmitted signals because in travelling through the communications channel 17, some of the information may be transposed or may be lost due to noise in the channel. The purpose of the decoder is to regenerate the original signal samples; that is, the decoder operates to reconstruct the sampled values $I_n$ of the analog waveform. By employing a smoothing filter 22, the reconstructed samples may be utilized to obtain a replica of the original analog signal waveform. The decoder has $2^{m+1}$ possible reconstruction values $r_1$, $r_2$ . . . , $r_{2m+1}$ available from store 21. There is a computational advantage for the system if the memory lengths of the encoder and decoder are respectively $m$ and $m+1$. It is possible, however, for the encoder and decoder to have other memory lengths. Each of the reconstruction values $r_1$, $r_2$ . . . , $r_{2m+1}$ is pre-computed in advance to correspond to one of the $2^{m+1}$ possible sequences of the $m+1$ binary digits entered in store 19. That storage device enters and stores the last $m+1$ binary digital signals, including the currently received digital signal $S_n'$. When the initial $m$ binary digits are entered in store 19, reconstruction level value selector 20 chooses from store 21 a reconstruction of $I_n$ called $R_n$ for every new digital signal $S_n'$ thereafter entered. Preferably the reconstruction values are applied to the input of a smoothing filter 21 whose characteristics are statistically designed so that it yields a faithful replica of the encoder's input analog waveform.

Figure 5:
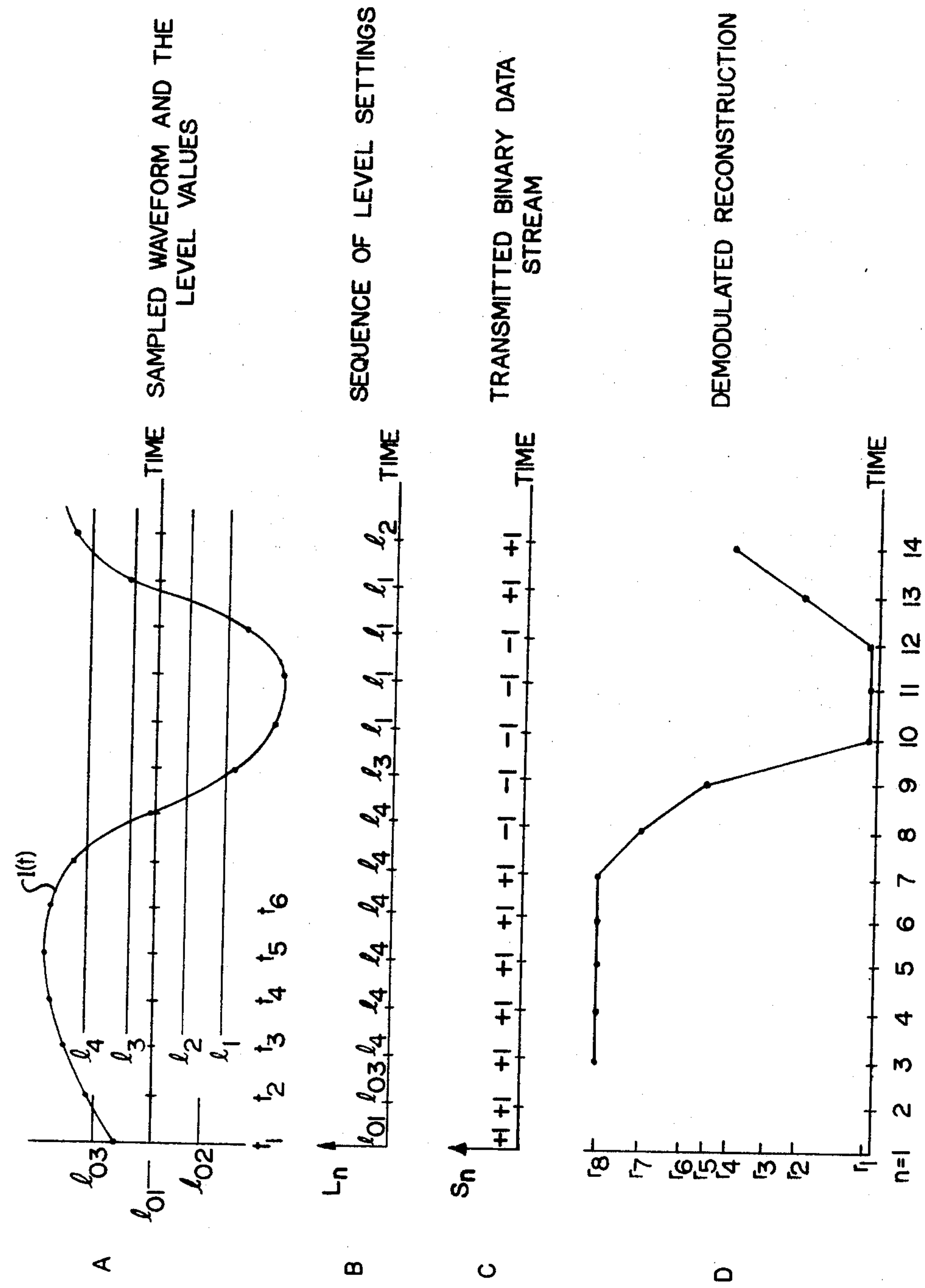

To illustrate the operation of the statistical delta modulation system of FIG. 4 when the channel is noiseless, the input analog signal applied to comparator 13 is depicted in FIG. 5A as waveform $I(t)$. At times $t_1$, $t_2$, $t_3$ . . . that waveform is compared in comparator 13 with level settings obtained from store 14. A possible set of level values $l_{01}$, $l_{02}$, $l_{03}$, $l_1$, $l_2$, $l_3$, and $l_4$ is indicated in FIG. 5A. At time $t_1$, the analog waveform is compared with level setting $l_{01}$ and, because the level setting is below the amplitude of the analog waveform, pulse modulator 12 emits a +1 binary signal and that signal, $S_1$, is also transmitted, as indicated in FIG. 5C, to the decoder. Signal $S_1$ is also entered into binary store 16 and causes selector 15 to choose level $l_{03}$ as the level setting $L_n$ that is applied to comparator 13. At time $t_2$, therefore, the analog waveform is compared in comparator 13 with level setting $l_{03}$, causing the next signal $S_2$ emitted by modulator 12 to be a +1 binary digital signal. Upon the entry of $S_2$ into store 16, the sequence of $S_1$ and $S_2$ causes selector 15 to choose level value $l_4$ from store 14 and that value then becomes the level setting in comparator 13. At time $t_3$, the analog signal is compared with level setting $l_4$, and because the analog signal is above that level, pulse modulator 12 emits $S_3$ as a +1 signal. Upon being entered into binary store 16, the sequence of $S_2$ and $S_3$ cause selector 15 to again select level value $l_4$ from store 14. The next comparison, at time $t_4$, in comparator 13 is therefore made with the $l_4$ level setting. By a repetition of the described process, the sequence of level settings in comparator 13 which ensues is indicated in FIG. 5B.

At the decoder, the binary data stream of FIG. 5C is received and the initial $m+1$ digits are entered into binary store 19. Based upon the sequence of digital signals, $S_{n-2}$, $S_{n-1}$, $S_n$, in the binary store, selector 20 chooses the reconstruction $R_n$ in accordance with the following rules:

| if $S_{n-2}$ | and $S_{n-1}$ | and $S_n$ | then $R_n$ |
|---|---|---|---|
| −1 | −1 | −1 | $r_1$ |
| −1 | −1 | +1 | $r_2$ |
| −1 | +1 | −1 | $r_3$ |
| −1 | +1 | +1 | $r_4$ |
| +1 | −1 | −1 | $r_5$ |
| +1 | −1 | +1 | $r_6$ |
| +1 | +1 | −1 | $r_7$ |
| +1 | +1 | +1 | $r_8$ |

The first three signals $S_1$, $S_2$, $S_3$, in the transmitted binary data stream are all +1's; hence, the sequence of binary digits initially entered into store 18 in the decoder is +1, +1, +1. In accordance with the foregoing rules, selector 20 causes the largest reconstruction value $r_8$ to be emitted from store 21, as indicated in the reconstructed waveform depicted in FIG. 5D. Because $S_4$, $S_5$, $S_6$, and $S_7$ are all +1's, the selector continues to select the $r_8$ reconstruction value four more times. $S_8$, however, is a −1 and therefore the sequence, when that signal is entered in store 19, becomes +1, +1, −1, which corresponds to reconstruction value $r_7$. Therefore, selector 20 causes store 21 to emit reconstruction value $r_7$ when $S_8$ enters binary store 19. $S_9$ is also a −1, so that upon its entry into store 19, the sequence becomes +1, −1, −1, which corresponds to reconstruction value $r_5$. Selector 20, therefore, causes store 21 to emit reconstruction value $r_5$ when $S_9$ enters binary store 19. $S_{10}$ is a −1 digit and when that signal enters store 19, the sequence becomes −1, −1, −1. Selector 20, upon the entry of $S_{10}$ into store 19, causes reconstruction value $r_1$ to be emitted from store 21. The peak to peak change from $r_8$ to $r_1$ can therefore be brought about by three successive signals. This example illustrates the capability of the statistical delta modulation system to respond much faster than the conventional delta modulation system to changes in the analog input signal and to thereby minimize the "slope limiting" encountered in the conventional system.

The techniques employed in determining the numerical values of the level values in the encoder and the reconstruction values in the decoder are set forth below. The equations here employed are based on a noiseless channel and on a minimum mean square error criterion; that is on minimizing $(I_n - R_n)^2$. The equations are used here only as examples as the design can be effected for other criteria and for noisy channels. For a general discussion regarding optimum design of a delta modulation system, see "Properties of an Optimum Digital System and Applications" by Terrence Fine, appearing in the IEEE Transactions on Information Theory, vol. IT–10, No. 4, October 1964, at pages 287 to 296. The notation herein employed is $\overline{S_n}$=sequence of the last $m$ transmitted signals beginning with $S_n$, i.e., $S_n, S_{n-1}, S_{n-2} \ldots S_{n-m+1}$ $\overline{S_n}^+$=the set of transmitted signals defined by:

$S_n=+1, \overline{S_{n-1}}$ $\overline{S_n}^-$=the set of transmitted signals defined by:

$S_n=-1, \overline{S_{n-1}}$

The sequences $\overline{S_n}^+$ and $\overline{S_n}^-$ each contain $m+1$ components and differ only in the binary value of their most recent digit, $S_n$.

The selection of the level and reconstruction values in the case, here assumed, of the noiseless communication channel and the minimum mean square error reconstruction criterion is given by the following two equations:

$$L_n=\tfrac{1}{2}R_n(\overline{S_n}^+)+\tfrac{1}{2}R_n(\overline{S_n}^-) \quad (1)$$

$$R_n(S_n, \overline{S_{n-1}})=E(I_n|S_n, \overline{S_{n-1}}) \quad (2)$$

The equations for the level values and reconstruction values become uncoupled if Equation (2) is substituted into Equation (1). Upon substituting there is obtained:

$$L_n=\tfrac{1}{2}E(I_n|S_n=+1, \overline{S_{n-1}})+\tfrac{1}{2}E(I_n|S_n=-1, \overline{S_{n-1}}) \quad (3)$$

It should be observed that $L_n$ is determined *before* $S_n$ is transmitted, while $R_n$ is determined *after* $S_n$ is received. Thus, Equation (3) shows that the level setting should be the arithmetic average of the two expected values of the input signal given that the past transmission formed the sequence $\overline{S_{n-1}}$, and $S_n=+1$ or $S_n=-1$. Those expectations can be found analytically if the $m+1^{st}$ order joint probability density function of the input process $I(t)$ is known. The two reconstruction values corresponding to the same past transmitted sequences $\overline{S_{n-1}}$ but differing present received signals $S_n$, are determined in the process of finding the level values.

In practice, the $m+1^{st}$ order probability density function of the information source may not be known, but representative input data may be available. In that case, the evaluation of the level values and reconstruction values need not be performed by first determining probability densities but can instead be found directly through estimation of the proper design parameters. To perform this estimation, it is necessary to have a sufficiently long input record that can be divided into many ($>2^m$) independent segments of $m$ samples. A scheme analogous to Equation (3) can be programmed on a computer whereby the level value is automatically sought until it coincides with the arithmetic mean of the averages of the samples above and below the level value. The output reconstruction value $R_n$ for a given sequence could then be estimated by the average of the sample values $I_n$ which fall above or below the level setting $L_n$ found for a particular transmitted sequence $S_n, \overline{S_{n-1}}$.

A start-up phase must again be considered as in the case of the analytical technique. For a system of memory length $m$ in the encoder and $m+1$ in the receiver, there are again twice as many output reconstruction values as there are level setting values employed after the start-up phase.

It is of utmost importance to note that the analysis represented by Equations (2) and (3) is required only in the synthesis phase of a statistical delta modulation system design. Once the actual numerical values of the level values and the reconstruction values have been determined, these values are placed in a store and are selected in accordance with the sequence of the last $m$ digits in the encoder and the last $m+1$ digits in the decoder.

Referring again to the encoder 10 depicted in FIG. 4, the binary store 16 may be simply a shift register having $m$ flip-flop stages. In FIG. 6, the binary store is illustrated as a shift register having two ($m=2$) flip-flop stages

23 and 24. The modulator 12 has two outputs, one output providing the +1 pulse signals and the other output providing the =1 output signals. As the negative pulses in the delta modulated train are, in practice, omitted in the transmission of the coded signals, only the positive pulse output of the modulator is coupled into the transmission channel. Upon the emission of a pulse from modulator 12, the information in flip-flop 24 is shifted out of the register, the information in flip-flop 23 is shifted to flip-flop 24, and the pulse itself is entered into flip-flop 23. That is, upon the emission of a pulse from modulator 12, information is shifted through the register 16. As no third stage follows flip-flop 24, the information shifted out of that flip-flop is "lost." The register 16 may be of the self-shifting type or clock pulse generator 11 may be used as a source of shift pulses for the register.

Shift register 16 provides four output signals, two outputs being obtained from flip-flop 23 and the other two outputs being obtained from flip-flop 24. One output of each flip-flop is marked with +1 to indicate that that output is at ground potential when a +1 signal is stored in the flip-flop. The other output of the flip-flop is marked −1 to indicate that that output is at ground potential when a −1 signal is stored in the flip-flop. Each flip-flop is constructed so that when one output is at ground potential, the other output is at a positive voltage. Hence, if a −1 signal is stored in flip-flop 24, its −1 output is at ground potential and its +1 output emits a positive voltage. Each of the four outputs of the shift register 16 is connected to a switching matrix which constitutes level value selector 15. Because of the arrangement of diodes in the switching matrix, the topmost horizontal line 25 of the matrix is at ground potential only when the sequence of digital signals in the shift register 16 is −1, −1. Horizontal line 26 is at ground potential only when the sequence of digital signals in the shift register is +1, −1; horizontal line 27 is at ground potential only when the sequence of digital signals is −1, +1; and horizontal line 28 is at ground potential only when the sequence of digital signals is +1, +1. Each of the horizontal lines of the switching matrix is coupled to a NOR gate in store 14. Each NOR gate 29, 30, 31, and 32 is constructed so that when its input is at a positive potential, it provides no output signal and when its input is at ground potential, it provides a signal at a specified voltage. The input to NOR gate 29 is obtained from line 25 of the switching matrix and when that input is at ground potential, NOR gate 29 emits a signal at level value $l_1$. The input to NOR gate 30 is obtained from line 26 of the switching matrix and when that input is at ground potential, NOR gate 30 emits a signal at level value $l_2$. Similarly, NOR gate 31 emits a signal at level value $l_3$ when line 27 is at ground potential and NOR gate 32 emits an $l_4$ level value signal when line 28 is at ground potential. Because of the switching matrix, only one NOR gate can emit a signal at any one time, and the level value of that signal is determined by the sequence of digits in shift register 16. The level value signal constitutes the level setting $L_n$ that is applied to comparator 13 in FIG. 4.

In the decoder 18 (FIG. 4), the binary store 19 may, as indicated in FIG. 7, be a shift register having three ($m+1=3$) flip-flop stages 32, 33, and 34. Where the negative pulses have been removed in transmission of the delta modulated pulse train, a shift pulse generator 35 is employed to shift information along register 19. The shift pulse generator is synchronized by the pulses in the received train. Reconstruction level value selector 20 is a switching matrix similar to that employed in the encoder. The set of $2^{m+1}$ reconstruction level values in store 21 is furnished by NOR gates 36, 37, 38, 39, 40, 41, 42, and 43. Each horizontal line in switching matrix 20 provides the input to a different one of the NOR gates. Each vertical line in the switching matrix is coupled to an output of a flip-flop in shift register 19. The outputs of flip-flops 32, 33, and 34 are marked +1 and −1 to indicate when those outputs are at ground potential, as previously explained in connection with the flip-flops in register 16. When the sequence of digits shown at the left of the horizontal lines in the switching matrix are entered in shift register 19, NOR gate 36 emits a signal at level value $r_1$, NOR gate 37 emits a signal at level value $r_2$, NOR gate 38 emits a signal at level value $r_3$, and so forth for NOR gates 39 to 43. Because of the diode arrangement in switching matrix 20, only one NOR gate can emit a signal at any one time and the level value of that signal is determined by the sequence of binary digits in shift register 19. The reconstruction level value signals emitted by the NOR gates may be coupled to the input of smoothing filter 22 so as to obtain a waveform more nearly approaching the form of the input analog signal. To prevent transients, arising from the shifting of information in register 19, from interfering with the operation of the decoder, the shift pulses from generator 35 may be employed to prevent all the NOR gates from furnishing any output signals during the time that information is shifted in the register.

In lieu of using an encoder having a shift register as the binary store 16 and a switching matrix as the selector 15, as shown in FIG. 6, the apparatus schematically shown in FIG. 8 may be employed. The positive and negative pulses from modulator 12 are applied to serially connected pulse delay networks 45, 46. Because of the delay networks, when pulse $S_{n-2}$ is at the output of delay network 46, the succeeding pulse $S_{n-1}$ is at the output of delay network 45. The output of delay network 45 is coupled to the input of an amplifier 47 and the output of delay network 46 is coupled to the input of an amplifier 48. Preferably, the gain of amplifier 47 is unity (viz, $G=2^0$) and amplifier 48 has a gain of 2 (viz, $G=2^1$). The choice of amplifier gain is not critical, as long as the gain of amplifier 48 is twice larger than the gain of amplifier 47. The outputs of amplifiers 47 and 48 are coupled to a summation network 49 which adds the outputs from the two amplifiers and emits a signal indicating the total of the inputs. The output signal of the summation network is applied to a set of four switches, 50, 51, 52, and 53, each switch when closed, emitting a signal at one of the level values, $l_1$, $l_2$, $l_3$, or $l_4$. The amplitude of the voltage emitted by summation network is governed by the sequence of the $S_{n-2}$ and $S_{n-1}$ signals. When the signal from pulse modulator 12 has a binary value of +1, a positive pulse appears on line 54, whereas when the signal from pulse modulator 12 is a binary −1, a negative pulse appears on line 54. Therefore, where $S_{n-2}$ and $S_{n-1}$ are both −1's, the output of summation network may for example be −3 volts, causing switch 50 to close and apply level value $l_1$ to comparator 13. Where the sequence of $S_{n-2}$ and $S_{n-1}$ is +1, −1, the output of summation network may for example be −1 volt, causing switch 51 to close and apply level value $l_2$ to the comparator. Where the sequence of $S_{n-2}$ and $S_{n-1}$ is −1, +1, the output of summation network may for example be +1 volt, causing switch 52 to close and apply level value $l_3$ to the comparator. Where the sequence of $S_{n-2}$ and $S_{n-1}$ is +1, +1, the output of summation network may for example be +3 volts, whereby switch 53 is caused to close and apply level value $l_4$ to comparator 13. Switches 50, 51, 52, and 53 are therefore responsive to the magnitude of the output from summation network 49, and the switches are arranged so that only one switch at a time can be closed.

In the arrangement illustrated in FIG. 8, the binary store 16 for the last *m* digits is provided by delay networks 45 and 46; the level value selector 15 is constituted by the signal amplifiers 47, 48 which, in effect, give binary weight to the $S_{n-2}$ and $S_{n-1}$ signals according to their position in the sequence of *m* digits, and by the summation network 49 which totals the weighted signals; and the store 14 for the set of $2^m$ level values is provided by switches 50, 51, 52, and 53.

In the embodiments depicted in FIGS. 6, 7, and 8, the logical NOR gates and the switches 50 to 53 which produce the level setting values were assumed to provide analog signals. The level value signals, however, need not be analog signals, but rather may be digital signals. In FIG. 4, for example, the level setting $L_n$ may be a digital signal which is compared, not directly with the analog signal, but with a digitized equivalent of the analog signal. Thus, comparator 13, rather than comparing analog signals, may compare digital signals. The basic scheme of the invention remains unaltered regardless of whether the compared signals take the form of analog signals or of digital signals.

The invention has been described as embodied in a binary system. However, the invention may be utilized in an *n*-ary system; that is, the invention may be used in a digital system having *n* permissible values. A binary system is merely an *n*-ary system where $n=2$. In an *n*-ary system where *n* exceeds two ($n>2$), the comparator takes the form of an *n*-level quantizer. In essence, the comparator compares the $I_n$ signal with a plurality of windows, each window including all amplitude values between successive thresholds. The threshold values which determine the windows are selected from the store of $n^m$ sets of level values in accordance with an address determined by the sequence of digits in *n*-ary store 16. The comparator quantizes the $I_n$ by sequential comparison with the windows. Alternatively, the comparator may comprise a plurality of stages which simultaneously compare the $I_n$ with every window in the set, and the stage having the window in which the $I_n$ is contained emits a signal to the pulse generator 12 causing it to generate the proper one of the *n*-ary signals.

In view of the multitude of ways in which the invention can be embodied, it is not intended that the scope of the invention be restricted to the precise structure illustrated in the drawings or described in the specification. Rather it is intended that the scope of the invention be limited by the claims appended hereto and to include such structures as do not in essence fairly depart from the invention there defined.

What is claimed is:

1. A delta modulation system comprising:

(A) an encoder having
- (1) a store of $2^m$ level values,
- (2) a comparator for intermittently comparing an input analog signal with a level setting supplied from the store of $2^m$ level values,
- (3) means for emitting a binary digital signal whose binary value is determined by the comparison made in the comparator,
- (4) a storage device for storing in sequence *m* of the last digital signals emitted by said means,
- (5) and a level value selector controlled by the sequence of digital signals in the storage device, the level value selector causing the level setting supplied to the comparator to be selected from the store of $2^m$ level values;

(B) and a decoder having
- (1) a store containing a set of $2^k$ reconstruction level values,
- (2) a storage device for storing in sequence *k* of the last received digital signals,
- (3) and a reconstruction level value selector controlled by the sequence of digital signals in the storage device, the selector causing a reconstruction level value signal to be emitted from the store containing the set of reconstruction level values.

2. A delta modulation system encoder comprising:

a store of $2^m$ level setting values;

a comparator for periodically comparing an input analog signal with a level setting signal supplied from the store of $2^m$ level setting values;

means for emitting a binary digital signal whose binary value is determined by the comparison made in the comparator;

a storage device for storing in sequence the last $m$ digital signals emitted by said means;

and a level value selector controlled by the sequence of digital signals in the storage device, the level value selector causing the level setting signal supplied to the comparator to be selected from the store of $2^m$ level values.

3. A delta modulation system encoder as in claim 2, wherein the storage device for storing the last $m$ digital signals is a shift register having a bistable stage for each digital signal of the $m$ digital signals.

4. A delta modulation system encoder as in claim 3, wherein the level value selector is a switching matrix controlled by the sequence of digital signals in the binary storage device.

5. A delta modulation system encoder in claim 4, wherein the store of $2^m$ level setting values is provided by a set of logical gates, each logical gate obtaining its input signal from the switching matrix, and each logical gate providing a different one of the $2^m$ level setting values.

6. A delta modulation system encoder comprising:

a plurality of signal controlled switches providing a store of $2^m$ level setting values, each switch responding to an input signal of a different magnitude by providing one of the $2^m$ level setting values;

a comparator for intermittently comparing an input analog signal with a level setting signal provided by one of the signal controlled switches;

a pulse modulator for emitting a binary digital signal whose binary value is determined by the comparison made in the comparator;

a storage device for storing the last $m$ digital signals emitted by the pulse modulator;

and means controlled by the sequence of the last $m$ digital signals in the storage device for applying to the signal controlled switches a signal whose magnitude is different for each sequence of the last $m$ digital signals.

7. A delta modulation system encoder comprising:

a plurality of voltage controlled switches, each switch providing a different one of $2^m$ level setting values;

a comparator for intermittently comparing an input analog signal with a level setting signal provided by one of the voltage controlled switches;

a pulse modulator for emitting a binary digital signal whose binary value is determined by the comparison made in the comparator;

signal delay apparatus coupled to the output of the pulse modulation whereby the least $m$ digital signals emitted by the pulse modulator exist concurrently in the apparatus;

and means controlled by the sequence of the last $m$ digital signals in the delay apparatus for applying to the voltage controlled switches a voltage whose magnitude is different for each possible sequence of the last $m$ digital signals.

8. A delta modulation system encoder comprising:

a plurality of voltage controlled switches, each switch providing a different one of $2^m$ level setting values;

a comparator for intermittently comparing an input analog signal with a level setting signal provided by one of the voltage controlled switches;

a pulse modulator for emitting a binary digital signal whose binary value is determined by the comparison made in the comparator;

signal delay apparatus coupled to the output of the pulse modulation whereby the last $m$ digital signals emitted by the pulse modulator exist concurrently in the apparatus;

means connected to the signal delay apparatus for converting the last $m$ digital signals to binary weighted signals; and means for summing the binary weighted signals and applying the summation signal to the voltage controlled switches.

9. A delta modulation system decoder, comprising:

a store containing a set of $2^k$ reconstruction level values;

a storage device for storing in sequence the last $k$ received digital signals;

and a reconstruction value selector controlled by the sequence of the $k$ digital signals in the storage device, the selector causing a reconstruction level value signal to be emitted from the store containing the set of $2^k$ reconstruction level values.

10. A delta modulation system decoder according to claim 9, wherein the storage device for storing in sequence $k$ of the last received digital signals is a shift register having a bistable stage for each of the $k$ signals.

11. A delta modulation system decoder according to claim 10, wherein the reconstruction level value selector is a switching matrix controlled by the states of the bistable stages of the shift register.

12. A delta modulation system decoder according to claim 11, wherein the store of $2^k$ reconstruction level values is provided by a set of logical gates, each logical gate having its input coupled to the switching matrix, and each logical gate providing a different one of the $2^k$ level setting values.

13. A delta modulation system encoder comprising:

(1) a store of $n^m$ level value sets, each set containing a plurality of levels;

(2) a comparator for intermittently comparing an input signal with a set of the levels supplied from the store of $n^m$ level value sets;

(3) means for emitting an $n$-ary signal whose $n$-ary value is determined by the comparison made in the comparator;

(4) a storage device for storing $m$ of the last $n$-ary signals emitted by said means;

(5) and a level value selector controlled by the sequence of $n$-ary signals in the storage device, the level value selector causing the set of level values supplied to the comparator to be selected from the store of $n^m$ level value sets.

14. A delta modulation system decoder comprising:

(1) a store containing a set of $n^k$ reconstruction level values;

(2) a storage device for storing in sequence $k$ of the last received delta modulated signals;

(3) and a reconstruction level value selector controlled by the sequence of signals in the storage device, the selector causing a reconstruction level value signal to be emitted from the store containing the set of $n^k$ reconstruction level values.

References Cited

UNITED STATES PATENTS

| | | | |
|---|---|---|---|
| 2,732,424 | 1/1956 | Oliver | 179—15.55 X |
| 2,905,756 | 9/1959 | Graham | 178—6 |
| 3,354,267 | 11/1967 | Crater | 325—38.1 |

ROBERT L. GRIFFIN, *Primary Examiner.*

J. T. STRATMAN, *Assistant Examiner.*